A. WHITTEMORE.
Horseshoe Nail Machine.
No. 1,060.
Reissued Oct. 9, 1860.
Fig. 1
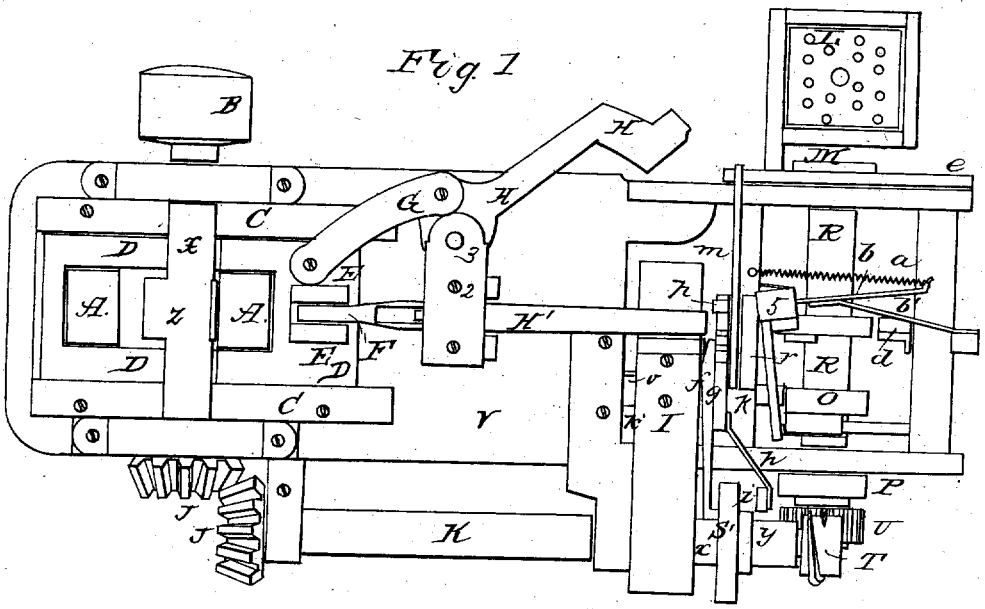
Fig. 2
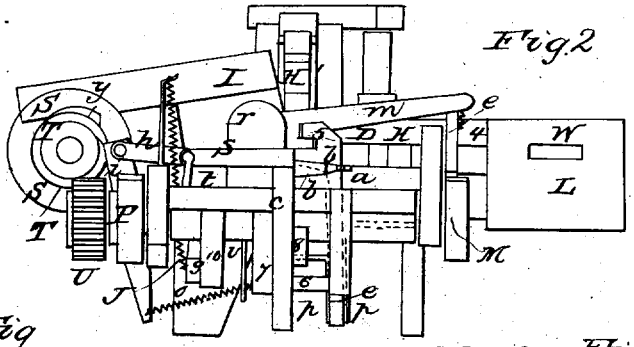
Fig. 9
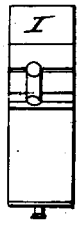
Fig
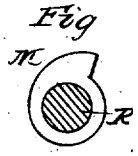
Fig. 4
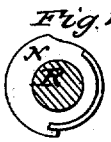
Fig. 5
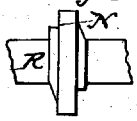
Fig. 6
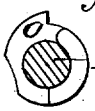
Fig. 7
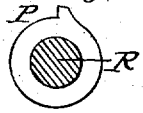
Fig. 8
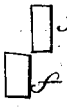
Witnesses
J. K. Alexander
Wm. A. Hufford
Inventor
Amos Whittemore
N. PETERS, Photo-Lithographer, Washington, D. C.

UNITED STATES PATENT OFFICE.

AMOS WHITTEMORE, OF CAMBRIDGEPORT, MASSACHUSETTS.

IMPROVED MACHINE FOR MAKING HORSESHOE-NAILS.

Specification forming part of Letters Patent No. 29,643, dated August 14, 1860; Reissue No. 1,030, dated October 9, 1860.

*To all whom it may concern:*

Be it known that I, AMOS WHITTEMORE, of Cambridgeport, in the county of Middlesex and State of Massachusetts, have invented certain new and useful Improvements in Machines for Making Horseshoe-Nails; and I do hereby declare the following to be a full, clear, and exact description of the same, reference being had to the annexed drawings, and to the letters of reference marked thereon, in which—

Figure 1 is a plan view; Fig. 2, a front view. Figs. 3, 4, 5, 6, and 7 are views of the various cams employed, and are represented in the drawings as standing in the same relative position to each other that they should when placed upon the shaft. Fig. 8 represents an end view of the knives, showing the mode in which they are beveled; Fig. 9, an end view of the anvil, showing the recess in the dies.

The nature of my invention consists in the employment and arrangement of certain devices for the purpose of making horseshoe-nails substantially in the manner hereinafter described.

To enable others skilled in the art to make and use my machine I will now describe its construction and operation.

D represents a sliding frame, in which the spools or rollers A A′ are placed.

*x* is the main or driving shaft, which is provided in its center, and immediately between the two rollers A A′, with a cam for the purpose of giving to the frame D a reciprocating motion.

J J′ are miter-wheels, placed upon the ends of the two shafts *x* and *k*.

B is a drum on the opposite end of shaft *x*.

F is a connecting lever pivoted at one end between the uprights E E on frame D.

G is also a connecting-lever, and is pivoted on the top of frame D, as fully represented in Fig. 1.

H H′ are the two hammers or beaters, which are constructed in the form shown in the drawings. H is the up and down beaters, and is pivoted between the uprights 1 and 2, near its top, while its lower end is pivoted to connecting-rod F. H′ is the side beater, through which the vertical rocking shaft 3 passes. Said beater is connected to frame D by means of connecting-lever G. Thus an alternating motion is imparted to both beaters.

I represents a reciprocating anvil, through which passes the pin K′. The anvil is stationary upon this pin, and is designed to move with it. Said pin protrudes through division *r* in front and the leg of the platform behind, and is operated in a manner which will be hereinafter fully explained.

*f g* represent the two knives or shears, which are beveled reversely or in opposite directions, as fully shown in Fig. 8, and pivoted together near the end at which they cut. The knife *g* is also pivoted below the division *r*. Thus they will be allowed to play backward and forward when operated upon for the purpose hereinafter set forth.

*h* is a rod, which connects knife *g* to lever *i*. Said lever is pivoted near its center to a piece which extends out from the division *r*, thus allowing it a free oscillating motion.

To the bottom of lever *i* is attached two spiral springs at right angles with each other. The opposite end of spring *o* is then secured to the under side of division *r*, as fully shown in Fig. 2 The other spring is not seen, but is attached to the leg of the platform. *m* is a lever, one end of which is pivoted to an upright on the division *r*, as shown. To the opposite end of lever *m* is attached the spiral spring 4. The other end of said spring is secured under the platform. The object of this lever is to hold the rod of iron while it is being cut, and also while the nail is undergoing its formation.

*e* also represents a lever, which is pivoted near the end of the platform. As said lever is designed to be operated by a cam, it should be provided with a projection. It will be observed that the end of the lever *m* rests upon that of lever *e*. Thus by this means is lever *m* made to perform its work with regularity and precision.

5 is an upright provided with a mouth, as seen in Fig. 2.

*s* is a lever, which is pivoted to upright 5 on the side of its mouth. Thus a lower jaw is formed by lever *s* and an upper jaw by the upright 5. It should be stated that the portion of the lever *s* which forms the lower jaw is fluted, in order that it may take a more firm hold upon the iron rod.

*b* is a rod extending out from upright 5, to the end of which is attached spiral spring *a*. The other end of said spring is fastened to division *r*, as fully shown in Fig. 1. *b* is also a rod connecting upright 5 to lever *c*. Said lever extends below the platform or frame and is allowed to oscillate freely by means of the bolt 6, passing through it. Said bolt is supported by the two pieces 7 and 8, as seen in Fig. 2.

*d* represents a gage, which is secured at its lower end to lever *c*. Its upper end is provided with a projection, and is operated upon by a cam, all of which will be more fully seen hereinafter.

8 is a screw, by means of which the gage is regulated.

9 is a lever, which is pivoted at one end to the stationary piece 10. At the other it is connected to lever *s* by means of the connecting-bar *t*.

J represents a spiral spring, the lower end of which is attached to lever 9 and the upper end to the rod, as fully shown in Fig. 2.

R is a shaft, upon which are the cams M, N, O, and P. The precise shape and construction of the cams are seen in their respective figures. On the end of shaft R is the cog-wheel U.

T is a perpetual screw on the end of shaft K, and by means of which motion is communicated to the shaft R.

S′ and T are two cams on shaft K, the use of which will be fully explained hereinafter.

*x* is a pin or lug on the side cam, S′, for the purpose of operating knife *f*.

The bottom and side of the vibrating anvil is provided with a recess for the reception of dies of various sizes. Thus if a larger or smaller nail is required a larger or smaller die is used accordingly. Said dies have a recess or groove across their center for the purpose of shielding the end of the nail from the stroke of the hammer until it is ready to be drawn out to a point. The side beater, H, and the side die have also a groove across their faces near their ends for the purpose of forming the head of the nail. It will be seen that the anvil I extends back and rests upon a cam on shaft K. By this means a rocking motion is imparted to it.

L represents the furnace, which is attached to the machine near its front end. Said furnace may be placed in the machine between the feeder and lever *m*, thereby rendering it necessary to use only one rod instead of four, as the rod in this case can be drawn through the fire until entirely consumed.

The operation of my invention is as follows: As the furnace is now shown, I use four rods, two being constantly kept in the machine and two in the furnace, and changing them as rapidly as necessity requires. The machine being put in motion, I first place one rod in the feeding apparatus, which is taken in through the holding apparatus composed of lever *m* and upright 5. A second is again placed in the feeding apparatus. The length of the nail is determined by a gage placed behind lever *m*. As the end of the first rod rests upon the anvil, the beaters or hammers, falling in rapid succession, lengthen and shape the nail. It will be observed that the rocking motion imparted to the anvil by means of the cam on shaft K is for the purpose of presenting to the beaters or hammers a square surface as they descend. The shaft K as it revolves brings the cam *o* in contact with pin K′, which forces the anvil back, thus causing the nail to be drawn or beaten to a point. On the opposite side of the anvil is placed a spring for the purpose of throwing it back to its proper position after the cam has passed the pin K′. The object of the recesses in the dies which are placed on the face of the anvil is to prevent the beaters from pounding the end of the nail until it is ready to be drawn out, thus avoiding the splitting or flaring the end of the nail, which would otherwise occur. After the pointing of the nail the cam T forces the shears up and cuts the nail off. The shears falling back in their proper place, the machine is again ready for the second operation.

Having thus fully described my invention, what I claim, and desire to secure by Letters Patent, is—

1. The anvil I, the same having both a rocking and reciprocating motion, in combination with adjustable or stationary dies, the faces of which shall be provided with a recess or groove for the purpose of preventing the pointing of the nail until its head and shank have been formed, substantially as set forth.

2. The pin K′, upon which is secured permanently the anvil I when the same shall be operated substantially as and for the purpose specified.

3. The mode of operating the shears or cutters, the same being made to advance at the proper moment to sever the nail from the rod, and then to fall back out of the way, substantially as and for the purpose described.

4. The various parts which constitute the feeding apparatus, consisting of upright 5, levers S and *c*, spiral spring *a*, and rod *b*, the whole being operated in the manner and for the purpose specified.

5. The levers *m* and *e*, acting in conjunction to hold the rod while the nail is undergoing its formation, substantially as and for the purpose specified.

6. The sliding frame D, in combination with the hammers H H, each being operated upon substantially as and for the purpose described.

AMOS WHITTEMORE.

Witnesses:

T. H. ALEXANDER,

WM. A. HUGHES.